(12) United States Patent
Shearer et al.

(10) Patent No.: US 9,725,371 B2
(45) Date of Patent: *Aug. 8, 2017

(54) BIOCHAR COMPOSITIONS AND METHODS OF USE THEREOF

(71) Applicant: Full Circle Biochar, Inc., San Francisco, CA (US)

(72) Inventors: David Shearer, San Francisco, CA (US); John Gaunt, Ithaca, NY (US)

(73) Assignee: Full Circle Biochar Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,503

(22) Filed: Oct. 3, 2014

(65) Prior Publication Data

US 2015/0128672 A1 May 14, 2015

Related U.S. Application Data

(63) Continuation of application No. PCT/US2013/035529, filed on Apr. 5, 2013.

(Continued)

(51) Int. Cl.
*C05B 17/00* (2006.01)
*C05C 11/00* (2006.01)
(Continued)

(52) U.S. Cl.
CPC .............. *C05B 17/00* (2013.01); *C05C 11/00* (2013.01); *C05D 9/02* (2013.01); *C05F 11/00* (2013.01);
(Continued)

(58) Field of Classification Search
CPC .................................. C05B 17/00; C05G 3/06
See application file for complete search history.

(56) References Cited

U.S. PATENT DOCUMENTS 4,822,935 A 4/1989 Scott
5,676,727 A 10/1997 Radlein et al.
(Continued)

FOREIGN PATENT DOCUMENTS

EP 0716056 A1 6/1996
EP 1739067 A1 1/2007
(Continued)

OTHER PUBLICATIONS

Hollingdale, et al. Charcoal Production a Handbook, Chapter 2, p. 7, Ecologic books, 1999, ISBN 1 899233 05 9.
(Continued)

*Primary Examiner* — Wayne Langel

(57) ABSTRACT

The invention provides for methods, devices, and systems for pyrolyzing biomass. A pyrolysis unit can be used for the pyrolysis of biomass to form gas, liquid, and solid products. The biomass materials can be selected such that an enhanced biochar is formed after pyrolysis. The biomass can be pyrolyzed under specified conditions such that a selected biochar core is formed. The pyrolysis process can form a stable biochar core that is inert and/or resistant to degradation. The biochar or biochar core can be functionalized to form a functionalized biochar or functionalized biochar core. Functionalized can include post-pyrolysis treatments such as supplementation with microbes or physical transformations including annealing and/or activation.

21 Claims, 4 Drawing Sheets

Related U.S. Application Data

(60) Provisional application No. 61/620,949, filed on Apr. 5, 2013.

(51) Int. Cl.

| | | |
|---|---|---|
| *C05G 3/00* | (2006.01) | |
| *C05D 9/02* | (2006.01) | |
| *C05F 11/00* | (2006.01) | |
| *C05F 11/02* | (2006.01) | |
| *C05F 11/04* | (2006.01) | |
| *C05G 3/06* | (2006.01) | |

(52) U.S. Cl.
CPC .............. *C05F 11/02* (2013.01); *C05F 11/04* (2013.01); *C05G 3/00* (2013.01); *C05G 3/06* (2013.01)

(56) References Cited

U.S. PATENT DOCUMENTS

| | | | |
|---|---|---|---|
| 6,060,507 | A | 5/2000 | Hill et al. |
| 6,189,463 | B1 | 2/2001 | Ling et al. |
| 6,682,578 | B2 | 1/2004 | Sower |
| 6,716,360 | B2 | 4/2004 | Titmas |
| 6,830,597 | B1 | 12/2004 | Green |
| 6,863,878 | B2 | 3/2005 | Klepper |
| 6,902,711 | B1 | 6/2005 | Fujimura et al. |
| 7,407,794 | B2 | 8/2008 | Elmer et al. |
| 8,197,573 | B2 | 6/2012 | Scharf |
| 8,202,332 | B2 | 6/2012 | Agblevor |
| 8,236,085 | B1 * | 8/2012 | Cheiky et al. ............ 71/6 |
| 8,361,186 | B1 * | 1/2013 | Shearer et al. ............ 71/32 |
| 8,747,797 | B2 * | 6/2014 | Shearer et al. ............ 423/445 R |
| 9,328,032 | B2 * | 5/2016 | Shearer ............ C05F 1/00 |
| 2004/0111968 | A1 | 6/2004 | Day et al. |
| 2007/0148754 | A1 | 6/2007 | Marrelli et al. |
| 2008/0016769 | A1 | 1/2008 | Pearson |
| 2008/0317657 | A1 | 12/2008 | Hall et al. |
| 2009/0031616 | A1 | 2/2009 | Agblevor |
| 2009/0126433 | A1 | 5/2009 | Piskorz et al. |
| 2010/0162780 | A1 | 7/2010 | Scharf |
| 2010/0170147 | A1 | 7/2010 | Mcneff et al. |
| 2010/0192457 | A1 | 8/2010 | Tsurutani et al. |
| 2010/0236309 | A1 | 9/2010 | Celia |
| 2010/0257775 | A1 | 10/2010 | Cheiky |
| 2010/0319424 | A1 | 12/2010 | Wietgrefe |
| 2011/0172092 | A1 | 7/2011 | Lee et al. |
| 2013/0213101 | A1 | 8/2013 | Shearer et al. |
| 2014/0352378 | A1 | 12/2014 | Shearer et al. |

FOREIGN PATENT DOCUMENTS

| | | |
|---|---|---|
| JP | 2001-252558 A | 9/2001 |
| WO | WO-9520879 A2 | 8/1995 |
| WO | WO-9520879 A3 | 9/1995 |
| WO | WO-2004037747 A2 | 5/2004 |
| WO | WO-2004037747 A3 | 2/2007 |
| WO | WO-2007054691 A1 | 5/2007 |
| WO | WO 2008/079029 A2 | 7/2008 |
| WO | WO-2008079029 A3 | 8/2008 |
| WO | WO 2009/016381 A2 | 2/2009 |
| WO | WO 2009/021528 A1 | 2/2009 |
| WO | WO-2009016381 A3 | 6/2009 |
| WO | WO-2009021528 A8 | 1/2010 |
| WO | WO-2010077961 A2 | 7/2010 |
| WO | WO 2010/129988 A1 | 11/2010 |
| WO | WO-2011140401 A2 | 11/2011 |
| WO | WO-2012170231 A2 | 12/2012 |

OTHER PUBLICATIONS

International search report and written opinion dated Jul. 26, 2013 for PCT Application No. US2013/035529.
Cheng, et al. Ageing of black carbon along a temperature gradient. Chemosphere. May 2009;75(8):1021-7. doi: 10.1016/j.chemosphere.2009.01.045. Epub Feb. 14, 2009.
Cheng, et al. Natural oxidation of black carbon in soils: changes in molecular form and surface charge along a climosequence. Geochimica et Cosmochimica Acta. Mar. 15, 2008;72(6):1598-610.
Cheng, et al. Oxidation of black carbon by biotic and abiotic processes. Organic Geochemistry. (2006) 37(11) : 1477-88.
Cheng, et al. Stability of black carbon in soils across a climatic gradient. J. Geophys. Res.; 2008. 113:G02027.
Gaunt, et al. Energy balance and emissions associated with biochar sequestration and pyrolysis bioenergy production. Environ. Sci. Technol. 2008; 42:4152-4158.
Lehmann. Bio-energy in the black. Front Ecol Environ. 2007; 5(7):381-387.
Liang, et al. Black carbon increases cation exchange capacity in soils. Soil Science Society of America Journal. Sep. 1, 2006;70(5):1719-30.
Notice of allowance dated Jan. 30, 2014 for U.S. Appl. No. 13/748,164.
Notice of allowance dated Sep. 14, 2015 for U.S. Appl. No. 14/297,349.
Notice of allowance dated Sep. 28, 2012 for U.S. Appl. No. 12/796,629.
Notice of allowance dated Sep. 28, 2015 for U.S. Appl. No. 14/297,349.
Office action dated Feb. 21, 2012 for U.S. Appl. No. 12/796,629.
Office action dated May 22, 2015 for U.S. Appl. No. 14/297,349.
Office action dated Jun. 3, 2013 for U.S. Appl. No. 13/748,164.
Office action dated Sep. 29, 2014 for U.S. Appl. No. 14/297,349.
Office action dated Oct. 3, 2011 for U.S. Appl. No. 12/796,629.
Small. Gardening with Biochar FAQ. Welcome to a Gardening with Biochar FAQ! Accessed Dec. 20, 2011. biochar.pbworks.com/w/page/9748043/FrontPage.
Warnock, et al. Mycorrhizal responses to biochar in soil—concepts and mechanisms. Plant and Soil 300.1-2 (2007): 9-20.
Wingate, et al. Potential of non-activated charcoals for land remediation. Sep. 9, 2008. www.forestresearch.gov.uk.
Co-pending U.S. Appl. No. 14/968,505, filed Dec. 14, 2015.
European search report and search opinion dated Jan. 18, 2016 for EP Application No. 13772455.5.
Notice of allowance dated Mar. 10, 2016 for U.S. Appl. No. 14/297,349.
Office Action dated Sep. 30, 2016 for U.S. Appl. No. 14/968,505.

\* cited by examiner

BIOCHAR COMPOSITIONS AND METHODS OF USE THEREOF

CROSS-REFERENCE

This application is a continuation application of PCT US2013/035529, filed Apr. 5, 2013, which claims the benefit of U.S. Provisional Application No. 61/620,949, filed Apr. 5, 2012, each of which application is entirely incorporated herein by reference.

BACKGROUND OF THE INVENTION

Increasing agricultural production in a sustainable way and mitigating the effects of climate change are two of the most important challenges facing the modern world. These challenges include a need for higher crop yields, a need to make degraded soils more productive, and a need to manage for productive agriculture with less dependable water resources. Some efforts have been made to reduce the long-term negative effects of agriculture by crop-rotation and organic farming. Efforts have been made to address climate change by reducing avoidable greenhouse gas emissions through production of renewable energy and offsetting unavoidable emissions through sequestration of carbon in the environment. Some carbon sequestration efforts have been aimed at storage of carbon in soil and of carbon dioxide in geologic formations. However, due to the inherent lack of long-term stability of plant derived biomass storage of carbon derived directly from plant biomass is not a long-term solution. Pyrolysis of biomass to produce a solid material called char, charcoal or more specifically biochar, which can be a product that is tailored for use as a soil amendment, can play a significant role in both of these efforts related to climate change and agriculture, but is currently limited by the use of biochars that exhibit instability or degradation and which may have positive or negative effects on soil flora, fauna and/or plant growth. Therefore, there is a need for improved methods, devices, and systems for the production of stable and/or beneficial biochars.

SUMMARY OF THE INVENTION

The invention provides for methods, devices, and systems for pyrolyzing biomass and producing enhanced and/or functionalized biochar. A pyrolysis unit can be used for the pyrolysis of biomass to form gas, liquid, and solid products. The biomass can be pyrolyzed under specified conditions such that a selected biochar core, also referred to as biocore elsewhere herein, is formed. The pyrolysis process can form a stable biochar core that is inert and/or resistant to degradation.

One aspect of the invention provides for a method for producing a selected type of biochar core comprising the steps of introducing a biomass feedstock to a pyrolysis unit and pyrolyzing the biomass in the pyrolysis unit in accordance with a predetermined set of operating parameters attuned to the selected biomass feedstock to produce the selected type of biochar core. The predetermined set of operating parameters can include, pre or post pyrolysis treatments of biochar as well as an established temperature range and rate of temperature change that corresponds to the selected type of biochar core. The invention also provides for systems and methods that include pre and/or post pyrolysis treatments of biochars.

Another aspect of the invention provides for the production of enhanced and/or functionalized biochar. Enhanced biochar can be produced by blending, mixing, other otherwise combining selected feed materials such that a selected biochar is formed by pyrolysis. Functionalized biochar can include, for example, a biocore that has been supplemented with a microbe or a nutrient or an organic substance.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

INCORPORATION BY REFERENCE

All publications and patent applications mentioned in this specification are herein incorporated by reference to the same extent as if each individual publication or patent application was specifically and individually indicated to be incorporated by reference.

DETAILED DESCRIPTION OF THE INVENTION

The invention provides for methods, devices, and systems for pyrolyzing biomass. A pyrolysis unit can be used for the pyrolysis of biomass to form gas, liquid, and solid products. The gas, liquid, and solid products can be syngas (the non-condensable, permanent gases including CO, $CO_2$, $CH_4$, $H_2$ and higher hydrocarbons of formula $C_xH_y$, which can be gaseous at 20° C. and atmospheric pressure), bio-oil (also referred to as pyrolysis liquids, pyroligneous acid, bio-fuel-oil, pyrolysis tars), and char, charcoal, biocarbon, agrichar, biochar, enhanced biochar, or biocore (also referred to as biochar core elsewhere herein), respectively.

Figure 1:
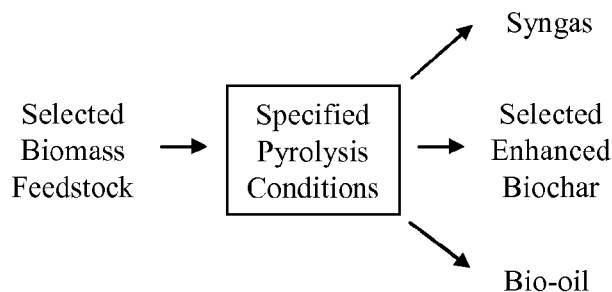
FIG. 1 shows a diagram of a process for producing an enhanced biochar.

As shown in FIG. 1, selected biomass materials, can be pyrolysed at specified pyrolysis conditions to form a selected enhanced biochars. The selection of biomass materials and/or the specified pyrolysis conditions can be altered to produce a variety of enhanced biochars that can be tailored to a variety of applications, described herein.

Figure 2:
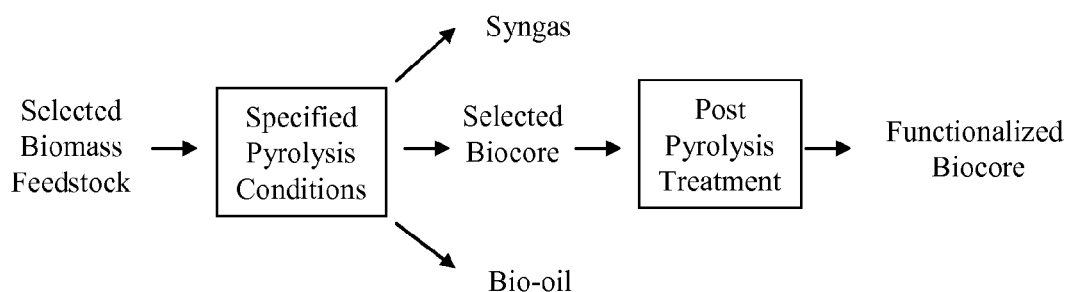
FIG. 2 shows a diagram of a process for producing a functionalized biochar.

As shown in FIG. 2, selected biomass materials can be pyrolyzed under specified conditions such that one or more selected biocores are formed. The pyrolysis process can form one or more stable biocores that are inert and/or resistant to degradation. The biocores can be configured, for example by blending with a supplement, for use as a soil amendment, as a potting mix, as a substitute in a growing media (including peat and/or compost media), as a horticultural media, as a carbon sequestration agent, a mitigant for soil greenhouse gas emissions, a fertilizing agent, a landscaping amendment, a turfgrass establishment, a bioremediation agent, a delivery agent for fungi or bacterial populations, or any combination thereof and not limited to the supplements listed. The biochar cores can be further tailored, enhanced and/or functionalized using a variety of methods, systems and processes described herein. In some embodiments of the invention, the biocores can be tailored, enhanced, and/or functionalized to a particular end use or application.

I. Biomass

The biomass used for formation of pyrolysis products can be obtained from a variety of sources. The biomass can be any material containing organic carbon. For example, the biomass can be plant material, cellulosic materials, lignin containing material, animal by-products, organic wastes, landfill matter, marine waste, agricultural waste, animal or human waste, other naturally derived sources of carbon, or any combination thereof. The biomass materials can also include compost, sewage sludge, or vinasse. Biomass materials can be blended to form a biomass feedstock. For example, biomass obtained from a softwood (e.g., a pine tree) or a hardwood (e.g., and oak tree) can be blended with poultry litter and then pyrolyzed. In some embodiments, metals or other chemicals can be blended with the biomass prior to pyrolysis. Examples of the pyrolysis of poultry litter and animal waste are described in JP2001252558, U.S. Pat. No. 6,189,463 and U.S. Patent Publication No. 2009/0031616, each of which are incorporated herein by reference.

In some embodiments of the invention, the biomass is selected based on the chemical content of the material, the elemental composition of the biomass, or the content of its elemental composition. For example, a biomass can be selected on its content of carbon, hydrogen, oxygen, nitrogen, phosphorous, potassium, selenium, cobalt, iron, manganese or any combination thereof in the biomass and any other elements. The biomass can be selected based on the content of water, oil, hydrocarbons, volatile compounds, organic carbon, volatile organic carbons, or any combination thereof. Any of these content parameters can be selected to be higher, lower, or up to about 1, 5, 10, 15, 20, 25, 30, 40, 50, 60, 70, 80, 85, 90, 95, or 99% by weight or volume.

In some embodiments of the invention, the biomass feedstock can be selected based on the energy content of the biomass materials. The energy content of the biomass feedstock, determined by the biomass materials used, can be at least, up to, greater than, or less than about 1, 5, 10, 15, 20, 25, or 30 GJ/ton, which can be measured on a dry (such as atmospheric or oven dry) weight or dry ash-free basis. In some embodiments of the invention, the biomass feedstock can be elected based on the particle size and shape of the biomass materials. The particle size and shape of the biomass feedstock can be controlled by cutting, crushing, grinding, screening or breaking of a biomass material. For example, trees can be chipped and/or ground to a particular particle size and then fed to a pyrolysis unit.

Selection of the biomass feedstock can allow for the formation of predetermined pyrolysis products. For example, a biomass feedstock can be formed from and crop such as switchgrass or miscanthus or a crop by-product such as corn stover and a biomass material with high nutrient content, such as manure or rapemeal, to form a biochar that may be used as a nutrient source. As another example, wood or high ash feedstocks (including feedstocks having greater than about 5% ash) can be supplemented to a biomass material to enhance the production of liquid pyrolysis products.

Pretreatment of biomass can relate to physical preparation of the biomass—drying (air, steam, warm exhaust gases or other), size reduction (milling, grinding, chopping, shredding), screening to a certain size fraction, or range of size fractions. Biomass can also be pretreated by the addition of elements and/or compounds, reacted with chemicals to reduce or remove any of the biomass constituents (including acid washing, alkali treatment, hot water washing, cold water washing, steam exposure, washing with an organic solvent, dissolution in ionic liquids). Biomass can also be thermally treated after drying to reduce its degree of polymerization, remove volatile compounds and/or extractives. This process can sometimes be called conditioning or torrefaction. In some embodiments of the invention, conditioning or torrefaction can be performed at temperatures lower than typical pyrolysis temperatures.

The biomass materials can be selected such that the pyrolysis products include an enhanced biochar or enhanced biochar core. The enhanced biochar or biochar core can be used for a variety of applications, including any application described herein. The enhanced biochar or biochar core can also be functionalized to form a functionalized and/or enhanced biochar core.

The invention also provides for a method for producing biochar with unique characteristics that enable the source of a biochar to be known. Feedstock materials with distinct C12:C13 isotope ratios can be used to produce biochar core with a distinct C12:C13 signal. The biochar core with distinct C12:C13 can then be introduced to a soil with a known and different C12:C13 ratio. The feedstock materials with distinct C12:C13 isotope ratios can be blended to produce biochar core with a distinct C12:C13 signal that is not naturally occurring. In some embodiments, the biochar can be produced using a predetermined set of operating parameters. The predetermined set of operating parameters can include a time-dependent temperature profile to produce a biochar core with distinct characteristic that can be measured by thermogravimetric analysis (TGA). In some embodiments, salts are added to feedstock prior to pyrolysis in order to produce material with a defined set of properties. In other embodiments, salts are introduced during pyrolysis in order to produce biochar with a defined set of properties.

II. Pyrolysis

The invention provides for a pyrolysis unit that can be used for formation of pyrolysis products from a biomass feedstock. The pyrolysis unit can control the pyrolysis conditions of the biomass feedstock such that selected types of pyrolysis products are formed. In some embodiments of the invention, a selected type of biochar core is formed from a selected biomass feedstock. The biochar core can be a stable biochar core that is inert and/or resistant to degradation, for example microbial, biological, chemical, thermal and/or oxidative degradation. The pyrolysis unit can be a gasifier or reactor, as described in U.S. Pat. Nos. 6,830,597 and 6,902,711, each of which are incorporated herein by reference in their entirety. Solid pyrolysis products, including biochar, that can be formed using the methods and devices described herein can also be referred to as pyrolysis char, charcoal, bio-carbon, or other similar names.

The pyrolysis unit can be operated in a batch, continuous, or semi-continuous mode. A biomass feedstock can be supplied or introduced to the pyrolysis unit, the biomass feedstock can be heated and/or pyrolyzed in the closed pyrolysis unit to form pyrolysis products, and then the pyrolysis unit can be opened for the removal of the pyrolysis products. The biomass feedstock can also be left in the pyrolysis unit until it has been partially or fully pyrolysed and cooled down, with removal of gas and vapor during pyrolysis; retention of all products inside the reactor until it has cooled down, or partial removal of the gas and vapor products during the pyrolysis process.

The pyrolysis products can be a selected type of biochar core that are produced from a predetermined biomass feedstock using a predetermined set of pyrolysis conditions and, optionally, secondary and/or tertiary treatment of the resultant biochar. For example, Feedstock A that is pyrolyzed under conditions G produce biochar core X. Feedstock A can be formed from a variety of biomass materials, so long as the biomass materials produce a blend of materials that exhibit properties that are within a specified range for feedstock A. Based on the properties of the feedstock, the conditions G are selected such that biochar core X will be formed. For example, pyrolysis time or temperature can be increased if the water content of the feedstock is increased. Conversely, pyrolysis time or temperature can be decreased if the water content of the feedstock is decreased. Alteration of the pyrolysis conditions based on the feedstock can allow for the production of biochar core X, which exhibits selected properties. Under certain circumstances, a feedstock can be chosen that does not fall within the specified range of properties for feedstock A. In this case, a biochar core that is not biochar core X is formed.

The pyrolysis of a biomass material involves a wide range of parameters, relating to the feedstock and to the pyrolysis process:

Biomass Related
  intrinsic properties of the biomass (e.g., original lignin, cellulose, hemi-cellulose, ash content and composition and extractives)
  biomass pretreatment (e.g., additives/ash content and concentration, moisture, chemical composition, changes in the proportions of lignin, cellulose, hemi-cellulose and extractives)
  biomass degree of polymerisation
  biomass density
  biomass particle size
  biomass particle shape
  biomass physical and thermal properties (e.g., specific heat capacity, thermal conductivity, permeability)
Pyrolysis Reactor Operation
  reactor temperature
  temperature at which pyrolysis occurs at the surface of the particle and/or at the geometric centre of the particle to assess completeness of pyrolysis
  product reactor residence time in the reactor
  product temperature in the reactor
  biomass heating rate and heat transfer
  biomass decomposition temperature or temperature range
  pressure (e.g., hydrostatic and mechanical)
  gaseous environment (e.g., gaseous environment in the reactor)
Recovery of the Final Products
  rate of thermal quenching of the products (e.g., char can be cooled with gas, liquid or solid)
  time/temperature profile of the cooling of the bio char One or more of these parameters, or any other parameters or conditions described herein, can be controlled to produce the biochar core products described herein. These parameters can be controlled to variable degrees and some parameters may have a greater influence on the properties of the pyrolysis products than others.

In some embodiments of the invention, materials can be fed to or removed from the pyrolysis unit under controlled conditions while the pyrolysis unit is operating. For example, syngas, bio-oil, biochar core, or any combination thereof produced during pyrolysis can be collected from the pyrolysis unit and used for heating of the pyrolysis unit, heat export, power generation or other applications including but not limited to the synthesis of chemicals and derived products. Alternatively, a biomass feedstock and/or with reagents can be added to the pyrolysis unit during the pyrolysis process. The pyrolysis unit can have a plurality of stages. The pyrolysis unit can have a first stage for heating and/or pyrolyzing the biomass feedstock under a first set of conditions and a second stage for heating and/or pyrolyzing the biomass feedstock under a second set of conditions. The biomass feedstock can be transferred first to the first stage and then to the second stage. Alternatively, the biomass feedstock can be moved through the pyrolysis unit in a continuous mode. The biomass feedstock can be pyrolyzed under a plurality of conditions as the biomass feedstock moves through the pyrolysis unit, or conversely retained in the unit until the processing has been completed.

The pyrolysis unit can have one or more temperature sensors for monitoring and controlling the temperature of the biomass feedstock during pyrolysis. The temperature sensors can be positioned throughout the pyrolysis unit such that the temperature sensors provide effective monitoring of the temperature of the biomass feedstock, the surface temperature of the biomass feedstock, and/or the environment surrounding the biomass and/or reagents. Similarly, the pyrolysis unit can have one or more pressure and/or oxygen sensors for monitoring and controlling the amount of pressure and/or oxygen in the pyrolysis unit. The pressure and/or oxygen sensors can be spaced throughout the pyrolysis unit for appropriate monitoring of the pressure and/or oxygen levels in the pyrolysis unit. Other instrumentation can be added as required to monitor and control the process.

Heat can be supplied to the pyrolysis unit using a variety of energy sources and in a variety of ways (hot gases, molten salts, hot sand and from contact with heated metal surfaces, microwaves). For example, energy sources can be combusted for the formation of heat, which can be transferred to the pyrolysis unit. Alternatively, microwave energy can be utilized for the pyrolysis of the biomass feedstock, as described in PCT Publication No. WO2008/079029, incorporated herein by reference in its entirety.

The pyrolysis unit can be operated under predetermined reaction conditions such that one or more selected pyrolysis products are formed. For example, the pyrolysis unit can be controlled such that a biomass feedstock is heated at a specific rate to a desired temperature while being exposed to a specified level of oxygen. The specific rate can be up to about, about, or less than about 0.01, 1, 10, 100, or 1000° C. per second, which can be determined at the reaction interface. The specific rate can be controlled to within about or less than about 5, 10, 20, or 40° C. per second, which can be determined at the reaction interface or at the centre of the particle. The temperature of the biomass feedstock, which can be the final or peak temperature, can be controlled to within about or less than about 100, 20, 10, or 5° C. The final temperature of the pyrolysed biomass can be a temperature up to about 200, 500, or 1000° C. The pyrolysis unit can be controlled such that the biomass feedstock is held at specific temperature for a desired amount of time. The time can be controlled to within about or less than about 50, 5, or 0.5 minutes. The pyrolysis products can be formed within the pyrolysis unit in about, greater than about or less than about 0.001, 0.01, 0.1, 1, 2, 3, 4, 5, 6, 7, or 10 days.

Some conditions for performing pyrolysis are described in PCT Patent Publication No. WO2009/016381, incorporated herein by reference in its entirety. The pyrolysis or charring process can involve heating a biomass feedstock over 250° C. under oxygen deficient conditions leading to its decomposition. Thus, the absence of an oxidizing agent, such as an acid, steam or air may be preferred. The temperature will normally be selected according to the substance to be charred and the extent to which it is desired to remove unwanted compounds (organic or inorganic) or other contaminants. The process may not need to be sealed, as the heated material can give off volatile products (condensable and non-condensable). Air ingress to the pyrolysis unit can be minimized or obviated by the addition of inert gas purging ($N_2$, Ar (or other noble gas), combustion products ($CO_2$, CO, $H_2O$), steam or restricting the ingress of air by operating the unit under a positive pressure). In some embodiments of the invention, pyrolysis conditions can maximize production of energy in the form of a variety of products, such as syngas or Biooil™, can maximize the production of a selected type of biochar, or can be optimized for a balance between energy production and biochar production. The selected type of biochar core can have particular characteristics, as described herein.

Some pyrolysis processes can be classified as slow pyrolysis or fast pyrolysis. Slow pyrolysis can be performed at temperatures of between 300 and 450° C. Slow pyrolysis can involve heating biomass feedstock at a temperature rate between about 0.1 to 50° C. per second. Fast pyrolysis can be performed at higher temperatures, which can be from 400-1000° C., depending on whether liquids or gases are to be optimized and/or the nature of the feedstock. Fast pyrolysis can involve heating biomass feedstock at a temperature rate change, which can be determined at the reaction interface, between about 100 to 1000° C. per second. The yield of products from pyrolysis, and/or whether or not the pyrolysis is fast or slow, can vary with temperature, feedstock composition and size/shape, residence time and heating rate. In some embodiments of the invention, increased amounts of char can be created per unit biomass at the lower pyrolysis temperatures. High temperature pyrolysis can produce greater amounts of syngas from the biomass.

Fast pyrolysis, including fast pyrolysis of soft or hardwood particles less than 6 mm in their maximum dimension at a reactor temperature of 450-525° C., can yield about 75% bio-oil (which may include reaction water), 14% biochar, and 11% syngas, and decomposition of the feedstock can be completed in seconds. Slow pyrolysis can be optimized to produce substantially more biochar (which can be up to ~45-50 wt % of the dry ash free biomass) and can take on the order of hours to complete. In some embodiments, slow pyrolysis can be performed at high pressure.

The invention provides for methods for producing a biochar core that can have particular carbon and/or volatile carbon content. Biochar exhibiting these particular properties can be produced using selected pyrolysis conditions described herein. For example, a biomass feedstock is heated at a sufficiently slow rate and for a sufficient amount of time such that volatile organics are allowed to escape from the biomass and do not recondense within the pyrolysis reactor. The volatile organics can be removed from the pyrolysis reactor thereby preventing the volatile organics from recondensing in the pyrolysis reactor or on the pyrolyzing biomass. Alternatively, the reaction conditions can be such that the volatile organics do not recondense in the pyrolysis reactor. In other embodiments of the invention, the reaction conditions can be such that the volatile organics recondense in the pyrolysis reactor, and in some cases, on the biomass feedstock. The rate of heating or the amount of heat applied can be such that the rate of release of volatile organics is less than about, about, or greater than about 75, 50, 30, 20, 10, 5, or 1% per hour of the total volatile organics present in the feedstock or that can be released by pyrolysis. The rate of heating or amount of heat applied can have multiple stages. For example, the rate of heating or amount of heat applied can be high and then low, or low and then high. In some embodiments of the invention, the rate of heating or amount of heat applied can change on a logarithmic, exponential, or linear scale. An example of the range of possible values of pyrolysis conditions and properties of resultant chars, including amount of volatile products in chars, are given in Table 1.

TABLE 1

Properties of charcoal produced at various temperatures from Acacia bussei produced in a muffle furnace

| Pyrolysis temp [° C.] | C [wt %] | H [wt %] | O[a] [wt %] | Ash [wt %] | Water [wt %] | Fixed volatiles [wt %] | Gross Carbon [wt %] | Calorific value [MJ/kg] | Charcoal yield[b] [wt %] | Energy yield[c] [%] |
|---|---|---|---|---|---|---|---|---|---|---|
| 300 | 30.2 | 5.67 | 63.73 | 0.4 | 1.9 | 70.8 | 28.8 | 22.4 | 56.27 | 65.92 |
| 400 | 71.5 | 3.93 | 22.17 | 2.4 | 2.8 | 30.9 | 66.7 | 29.88 | 28.03 | 43.80 |
| 500 | 87.0 | 3.10 | 8.50 | 1.4 | 2.8 | 17.7 | 80.9 | 32.14 | 22.65 | 38.07 |
| 600 | 87.5 | 2.67 | 6.93 | 2.9 | 1.0 | 7.1 | 90.0 | 33.20 | 21.63 | 37.56 |
| 700 | 92.4 | 1.71 | 3.89 | 2.0 | 1.8 | 3.9 | 94.1 | 33.40 | 20.16 | 34.22 |
| 800 | 93.4 | 1.03 | 3.57 | 2.0 | 2.2 | 2.4 | 95.6 | 33.90 | 19.54 | 34.64 |

Notes:
[a]assumes no sulphur or nitrogen present
[b]dry weight of charcoal divided by weight of wood
[c]gross calorific value of charcoal multiplied by charcoal yield divided by gross calorific value of the wood.
Reference: Hollingdale, A. C., Krishnan, R., Robinson, A. P., "Charcoal Production A Handbook", Chapter 2, page 7, Eco-logic books, 1999, ISBN 1 899233 05 9.

The biomass feedstock can be heated for enough time and under sufficient temperature conditions that the biochar core product has a selected and/or controlled carbon content. The carbon content can be greater than about, about, or less than about 10, 20, 40, 60, 75, 80, 90, 95, 97, 99, or 99.5 wt %. The carbon content can be measured as a portion of the dry weight of the bio char.

The biomass feedstock can be heated for enough time and under sufficient temperature conditions that the biochar core product has a selected and/or controlled volatiles content. The volatiles content can be greater than about, about, or less than 90, 80, 50, 30, 25, 20, 15, 10, 5, 1, or 0.1 wt %. The volatiles content can be measured as a portion of the dry weight of the biochar or the total weight of the biochar.

In some embodiments of the invention, the pyrolysis conditions can be such that a selected biochar core having an elemental composition or physical characteristic described herein. For example, the pyrolysis conditions can be such that biochar core has a selected content of carbon, nitrogen, oxygen, hydrogen, potassium, or phosphorous. Alternatively, the pyrolysis conditions can be such that the biochar core has a desired cation exchange capacity, density, porosity, pore size, average pore size, crystallinity, size distribution, surface area, surface area per mass, or adsorption capacity.

In some embodiments of the invention, the conditions for pyrolysis can include a temperature heating rate that is less than about 50, 10, 5, 1, or 0.1° C. and a final temperature can of greater than about 500, 600, 700, 800, 900, or 1000° C.

In some embodiments of the invention, completion of the pyrolysis process is determined by monitoring the rate of release of compounds from the biomass feedstock. Once the rate of release of compounds has decreased to about 0.5, 1, 5, 10, 20, or 50% of the maximum rate of release of compounds, the pyrolysis process may be deemed to have completed. The compounds that are monitored for release can be volatiles, organic carbons, volatile organic carbons, volatile carbons, water vapor or organic volatiles and/or permanent gases such as $CO_2$, $CO$, $H_2$, $CH_4$ and other higher hydrocarbons. Alternatively, the pyrolysis process can be performed until the biochar product formed has a volatile (volatile containing solid compounds, volatile organic compounds, or volatile carbon compounds) content of greater than about, about, or less than about 90, 80, 50, 30, 25, 20, 15, 10, 5, 1, or 0.1 wt %. The pyrolysis conditions can be such that the amount of volatiles in the biochar product can be controlled to within 0.1, 1, 5, or 10 wt %. The amount of volatiles can be measured by analysis of the composition of the biochar immediately after removal from the pyrolysis reactor or after post-pyrolysis treatment. In some embodiments, the percentage is determined as a percentage of total mass of the biochar. In other embodiments of the invention, the percentage is determined as a percentage of non-volatile carbons.

The invention provides for use of the pyrolysis products for the pyrolysis process. For example, the invention provides for post-heating management of the pyrolysis products. Heat in the pyrolysis products can be recovered and/or used for the heating and/or drying and/or torrefaction of the biomass feedstock. Alternatively, the heat from the pyrolysis products can be used for the generation of energy. For example, heat from the pyrolysis products can be used to heat a steam generator for production of electricity or for activation of the biochar using steam, $CO_2$, or combination of thereof. In other embodiments of the invention, pyrolysis products can be used for the generation of energy, which can be used to power the pyrolysis process. The invention also provides for a variety of methods and processes to modify the pyrolysis products, described herein.

III. Biochar Post-Pyrolysis Treatment

In some embodiments of the invention, the pyrolyzed biomass is subjected to post-treatment. Post-treatment can be used to control the characteristics of the biochar core product, such that a specific biochar core product is formed. Post-treatment can include solvent washing, high temperature heating, gasification, sorting, grinding, chipping, or chopping. For example, pyrolyzed biomass can be subjected to an organic solvent wash to remove volatiles from the pyrolyzed biomass. Alternatively, the pyrolyzed biomass can be sorted for size and/or density, such that pyrolyzed biomass particles of a specified size and/or density distribution are grouped together.

IV. Biochar Core

The biochar core produced using the methods, devices, and systems described herein can have selected properties that improve the functional characteristics of the biochar core in a variety of applications. These properties can include the elemental composition of the biochar core, such as carbon, total carbon, organic carbon, total organic carbon, nitrogen, oxygen, hydrogen, potassium, or phosphorous content and other non-specified elements. The selected content levels of these elemental compositions within the biochar core can be any level described herein. Other selected properties of the biochar core can include cation exchange capacity, density, porosity, pore size, average pore size, crystallinity, size distribution, surface area, surface area per mass, or adsorption capacity. The porosity can be a fraction of the total volume greater than about, about, or less than about 0, 0.1, 0.2, 0.3, 0.4, 0.5, 0.6, 0.7, 0.8, 0.9, or 1.0. The pore size or average pore size can be in the range of 5 to 50 μm. The pore size or average pore size can be greater than about, about, or less than about 0.01, 0.1, 1, 5, 10, 25, 50, 100, 200, 400, or 1000 μm. The surface area can be greater than about, about, or less than about 1, 5, 50, 100, 300, 500, 750, 1000, 2500, or 5000 $m^2$ per gram.

The biochar core properties can be selected such that the biochar core is stable, inert and/or exhibits reduced degradation over time. The degradation of the biochar core can be through biotic, abiotic, chemical or oxidative reactions. The degradation can be measured by determining the amount of carbon in the biochar core as a percent of initial carbon in the biochar core after pyrolysis. The carbon can be organic carbon, inorganic carbon, or both inorganic and organic carbon. The rate of degradation can be about or less than about 20, 15, 10, 5, 2.5, 1, 0.5, or 0.1% per year. The rate of degradation can be measured over a time span of 1, 2, 5, or 10 years or longer. Alternatively, the rate of degradation can be measured over one, two, or three months in the first, second, third, fourth, or fifth year after production of the biochar core or after use of the biochar core for a particular purpose. The particular purpose can be use of the biochar core as a soil amendment, fertilizing agent, microbial delivery agent, or any other purpose described herein.

The rate of degradation can be controlled by selection of the properties of the biochar core. For example, the biochar core produced using the methods described herein can have a low volatile organic carbon content and/or a highly stable non-volatile component. This can reduce the degree that the biochar core can be degraded by microbial organisms that may utilize the biochar core as an energy or nutrient source. In some embodiments of the invention, the biochar core can have a controlled rate of degradation based on the form of carbon in the biochar core. These forms can include any of the forms described herein, and can be selected by a variety of parameters, including the type of biomass feed material. In other embodiments of the invention, post-pyrolysis treatments, such as annealing, can be used to control the rate of degradation of the biochar core. The biochar core can be produced such that it has a high carbon content and can easily degrade or be stable.

V. Biochar Functionalization

The biochar core and/or enhanced biochar core can be functionalized or processed by a variety of methods to form a functionalized biochar. For example, the biochar core can be sorted, chemically or physically treated, or supplemented with nutrients, chemicals, or organisms. In some embodiments of the invention, the biochar core can be sorted by size or density such that biochar core particles of a particular size distribution or density are grouped together. Alternatively, the biochar core can be treated chemically and/or physically to form a biochar with activated carbon. The activated carbon can have an increased surface area, porosity, water retention, or cation exchange capacity that allows for improved functional activity of the biochar core. For example, the biochar with activated carbon can have increased capacity to hold nutrients or microbial inoculants.

In some embodiments of the invention, the biochar core or activated biochar core are mixed or blended with a supplement. The supplement can include inorganic chemicals such as fertilizers and nutrients. Alternatively, the supplement can organic materials with properties that increase the CEC, nutrient content or performance of biochar as a microbial habitat or it may be organisms such as fungi or bacteria or combinations of thereof.

The chemicals that can be mixed with the biochar core include nitrogen, phosphorous, potassium, calcium, sulphur, and magnesium sources. The sources can be in the form of fertilizer, compost, manure, ammonia, ammonium nitrate, urea, lime, limestone, rock phosphate, salt peter, gypsum, crop or other inorganic and organic compound containing these elements.

The biochar products can be supplemented with nutrient sources or other materials, such as those described herein, to form a biochar product with a known, desired, or selected amount of nutrients or other materials.

Organisms that can be supplemented to the biochar core can include fungi and bacteria. In some embodiments of the invention, the biochar core can be supplemented with *trichoderma*. Examples of *trichoderma* are discussed in U.S. Pat. No. 6,060,507, incorporated herein by reference in its entirety.

Other organisms can include *Accumulibacter phophatis, Anabaena, Azolla, Bacillus circulans, Bacillus subtilis* var natto, *Bifidobacterium animalis, Bifidobacterium bifidum, Bifidobacterium longum, Deinococcus radiodurans, Lactobacillus acidophilus, Lactobacillus buchneri, Lactobacillus bulgaricus, Lactobacillus casei, Lactobacillus delbrueckii, Lactobacillus plantarum, Lactococcus diacetylactis, Lactococcus lactic, Mycorrhiza, Pseudomonas aeruginosa, Pseudomonas putida, Ralstonia metallidurans, Rhizobia, Rhodobacter, Rhodopseudomonas palustris, Rhodopseudomonas sphaeroides, Saccharomyces cerevisiae, Streptococcus thermophilus, Ulocladium oudemansii,* or *Xanthomonas maltophilia*. The rhizobacteria can be a *rhizobium* plant growth promoting rhizobacteria. Combinations of these organisms can be supplemented to a biochar core. A combination of organisms can be chosen based on the symbiotic relationships between organisms and the desired functionality of the biochar core. For example, thiobacteria can be supplemented to a biochar core for forming a bioremediation agent. In some embodiments, beneficial bacteria can be supplemented to a biochar core.

Organisms that can be supplemented to the biochar core can be organisms that have been identified as an efficient microorganism. These organisms can control the growth of fungus or other adverse species. Alternatively, these organisms can be used for the generation of nutrients that are beneficial to the growth of particular organisms, such as plants. For example, some organisms can be used to increase the rate of nitrogen fixation in soil. The biochar can be produced such that is has an architecture is desirable as a habitat for one or more organisms. sugars and nutrients can be supplemented to facilitate a desirable habitat. The biochar can be packed in a way that ensures viability of the one or more organisms, which may be inoculants.

The organisms can be added to the biochar core along with nutrients that may allow the organisms to remain viable until the biochar is applied to a particular site. In other embodiments of the invention, organisms can be added to the biochar core without nutrients or selected nutrients or with or without organic supplements. The functionalized biochar can be designed such that a sufficient amount of colony-forming units of an organism are present upon application of the functionalized biochar to a site for inoculation by the organism.

In other embodiments, the invention provides for a method to alter the effective cation exchange capacity of biochar. A biochar core can be mixed with organic materials to alter the CEC of the resultant product. A biochar or biochar core can be leached with solutions containing acids, such as humic acids, fulvic acids, or any combination thereof. The acids can be solid humic acids, solid fulvic acids, or any combination or blend thereof.

The invention also provides for methods for changing the pH and/or lime equivalency of biochar. Biochar productions methods can include a post pyrolysis step of adding chemicals to immediately lower the pH of biochar. In other embodiments, the post pyrolysis step can include blending biochar with organic matter materials to either increase or decrease the pH of the resultant mixture. The post pyrolysis step can include adding elements and chemicals to lower the pH of biochar over time. The post pyrolysis step can include blending biochar with organic matter materials and chemicals to either increase or decrease the pH of the resultant mixture.

Figure 3:
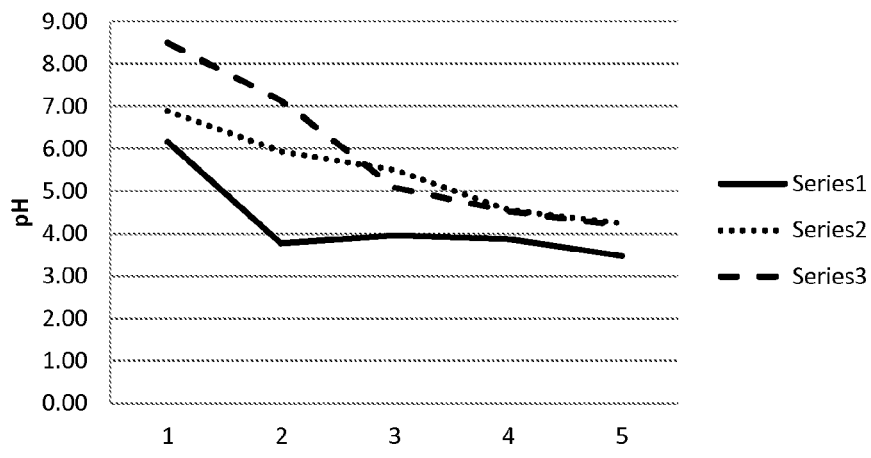
FIG. 3 is a graph showing pH adjustment of biochar.

The post pyrolysis step can include adding elements and chemicals to increase the pH of biochar. The chemicals used to adjust the pH of the biochar can include $AlSO_4$ and sulfur-based acids or bases. The pH can be adjusted to be about, less than about, or greater than about 1, 2, 3, 4, 5, 6, 7, 8, 9, 10, 11, 12, 13, or 14. The pH adjusted biochar can maintain its adjusted pH for a period of at least 0.5, 1, 2, 3, 4, 5, or more years. For example, FIG. 3 shows the effect of using $AlSO_4$ to treat biochar (series 1), biochar blended with green waste (series 2) and composted dairy manure (series 3). The pH was measured 5 days after amendment. In FIG. 3, the x-axis indicates the amount of $AlSO_4$ used, where 1 corresponds to 0 grams, 2 corresponds to 2.5 grams, 3 corresponds to 5 grams, 4 corresponds to 10 grams, and 5 corresponds to 20 grams. As can be observed, the pH of the biochar can be readily adjusted by using varying amounts of AlSO4. The composts and biochar can be form from food waste, such as food scraps, compostable plates, which can be mixed with yard and wood waste. The materials can be ground using a tub grinder prior to composting. The composts and biochar can be screened to pass a 6 mm sieve prior to mixing.

The pH measurement can be measured using a saturated media extract. Water can be added to saturate the growing media and the growing media can be allowed to equilibrate for 2 hours. Then, approximately 50 ml of additional water can be added and the displaced solution can be collected over a 10 minute period. The pH and/or electrical conductivity can be measured on this collected.

VI. Biochar Porosity

Figure 4:
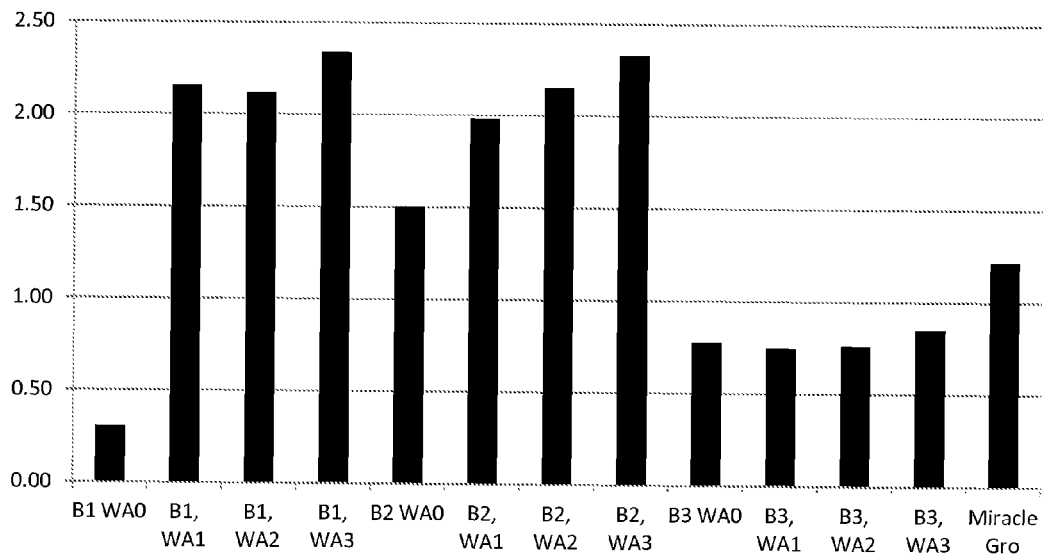
FIG. 4 is a graph depicting the effects of treating biochar with a wetting agent.

The methods described herein provide for a method for altering the porosity and/or water holding characteristics of biochar. In some embodiments, methods for altering porosity and/or water holding characteristics include mixing biochar post pyrolysis with wetting agents. Other embodiments provide for extended heating or annealing to remove pyrolysis liquids from biochar core and to remove materials that cause hydrophobicity. The biochar can be blended with organic materials to deliver blended products with defined porosity and water holding characteristics. FIG. 4 is a graph showing the modification of various types of biochar using a wetting agent. Biochar was produced from softwood chips having approximately 25-30 mm max diameter and a moisture of 10-20% on a dry weight basis. In FIG. 4, the biochars B1, B2, and B3 were produced according to the following heating temperatures and residence times: B1—600° C. (range 580-600° C.), Residence time of 50 minutes; B2—500° C. (range 480-520° C.), Residence time 50-60 minute; and B3—400° C. (range 380 to 430° C.), Residence time 67 minutes. The wetting agents used were the following: WA0—distilled water; WA1—12.50 mL wetting agent/L water; WA2—25.00 mL wetting agent/L water; and WA3—50.00 mL wetting agent/L water; 5 ml of WA0, WA1, WA2, respectively, was added 39 cubic inches of biochar. The wetting agent was Aquatrols AG2000, which comprises 99% Non-Ionic surfactant, <1% water, <0.0025% Ethylene Oxide, and <0.002% Dioxane.

The y-axis depicts g of $H_2O$/g of media (or biochar or biochar blend). Water retention was measured as g of water retained/g sample after a saturated sample was allowed to drain for approximately 12 hours. As can be observed from FIG. 4, the water retention characteristics of the biochar or biochar blend can be readily adjusted to be significantly higher or lower than currently available products, allowing for greater control over soil moisture conditions and higher yield of the soil. In some embodiments, the biochar or biochar blend can have a water retention of at least about, about, or less than about 0.1, 0.2, 0.3, 0.5, 0.75, 1, 1.25, 1.5, 1.75, 2, 2.5, or 3 g of water/g of biochar or biochar blend. In some embodiments, the biochar or biochar blend can have a water retention of between about 1.5 to 2.5 g of water/g of biochar or biochar blend.

The methods described herein also provide for a method to alter the porosity, water holding and physical characteristics of growing media. The invention provides for a method of including selecting feedstock and pyrolysis conditions to influence the porosity of biochar. In some embodiments, biochar size characteristics are altered post pyrolysis by mechanical means. The particle size of biochar can be altered by pre-pyrolysis processing of feedstock.

Figure 5:
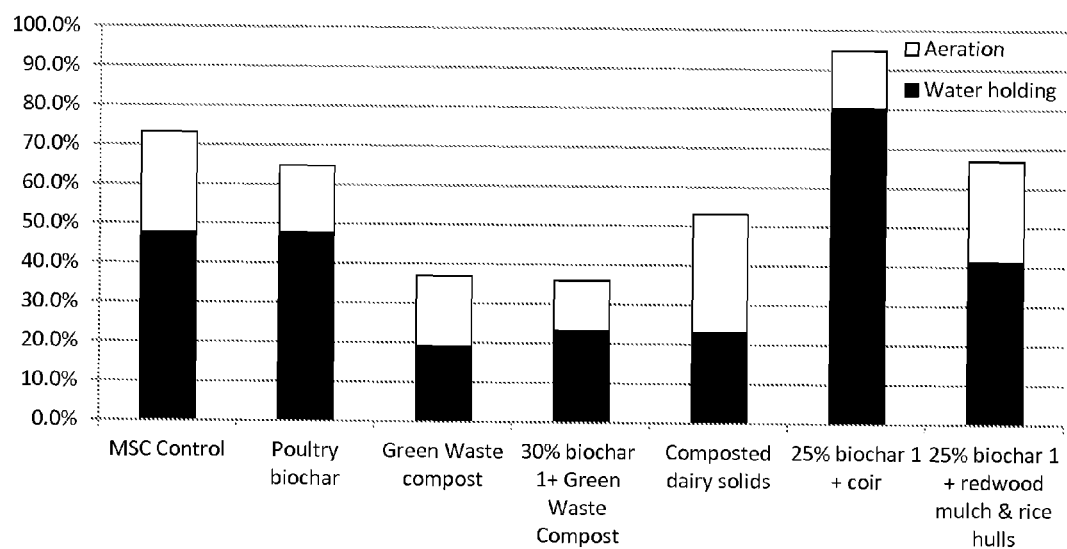
FIG. 5 is a graph depicting the aeration and water holding characteristics of various biochar blends.

FIG. 5 shows a graph of biochar compositions (Poultry biochar, Blend 1, Blend 2, Blend 3, and Blend 4) having varying aeration and water holding characteristics, along with the aeration and water holding characteristics for Miracle Grow, MSC (Mulch and Soil Council) Control, Westside peat mix. By controlling proportions of biochar in blends and selecting blending materials we can produce products with a wide range of total porosity with different aeration, and water holding characteristics.

Biochars described herein can have a selected total porosity and water holding capacity. The total porosity can be about, less than about, or greater than about 5, 10, 15, 20, 25, 30, 35, 40, 45, 50, 55, 60, 65, 70, 75, 80, 90 or 95%. The aeration can be about, less than about, or greater than about 5, 10, 15, 20, 25, 30, 35, 40, 45, 50, 55, 60, 65, 70, 75, 80, 90 or 95%. The water holding capacity can be about, less than about, or greater than about 5, 10, 15, 20, 25, 30, 35, 40, 45, 50, 55, 60, 65, 70, 75, 80, 90 or 95%. In some embodiments, the water holding capacity can be increased, to effectively create a reservoir of plant available water), while maintaining an air filled porosity that allows air to reach the plant roots. This increased control over other soil amendments allows for improved soil performance, including increased plant growth and/or yield.

To determine aeration, total porosity and water holding characteristics, a known volume of a sample, such as soil, growing media, or biochar can be placed in a pvc cylinder with a drilled cap on the base. The holes can be covered, and then the sample can be saturated with water. Once saturated, the sample can be weighed again. The weight of water in the sample (W1) added represents the total porosity in the soil. The drain holes can be unblocked and the soil can be allowed to drain overnight (approx 12-16 hours) and the water can be weighed again (W2). W2 represents the water holding capacity and W1−W2=air filled porosity or aeration. In FIG. 5, the air filled porosity/aeration and water holding capacity are expressed as percentages, as determined by the following: aeration=(W1−W2)/(W1+sample weight); water holding capacity=W2/(W1+sample weight).

VII. Biochar Applications

The methods of the invention provide for the use of biochar for a variety of purposes. The biochar can be used as a soil amendment, potting mix, a substitute in a growing media (including peat and/or compost media), a horticultural media, a carbon sequestration agent, a fertilizing agent, a turfgrass establishment, a bioremediation agent, a delivery agent for a fungi or bacterial population, a synthetic "terra preta" (or equivalent material) or any combination thereof.

In some embodiments of the invention, the biochar is used for carbon sequestration by fixing of carbon in the soil in a recalcitrant form. An example of the use of biochar for carbon sequestration is described in U.S. Patent Application No. 2004/0111968, incorporated herein by reference in its entirety. When the biochar is used for carbon sequestration, the biochar core is selected to have resistance to degradation, as described herein. The time scale for the biochar core can be greater than about, less than about, or on the order of hundreds of years.

In other embodiments of the invention, biochar or an enhanced and/or functionalized biochar can be used for mitigation of soil greenhouse gas emissions. For example, an enhanced and/or functionalized biochar can be used to reduce emission of methane or nitrogen containing gases, such as nitrous oxide.

In other embodiments of the invention, the biochar is used for on-demand release of chemicals or other materials. These chemicals can be fertilizers, nutrients, or other materials that are depleted over time at a particular site. The chemicals can also be chemicals that create a protective environment for a desired organism to be grown, e.g., pesticides or insecticides or other chemicals that may attract or support beneficial organisms. The fertilizers, nutrients, or other materials can be depleted by organisms such as plants and microbes. The chemicals can be released from the biochar based on the concentration of the fertilizer, nutrients, or other materials in the surrounding environment. The release of the chemicals can be such that the concentration of the chemical in the surrounding environment is maintained at a relatively constant level.

The biochars described herein can be used to enhance agricultural output, horticultural qualities, or turf grass. For example, biochars can be used to improve the yield of an agricultural crop and/or to improve the resistance of the crop to detrimental environmental effects. Detrimental environmental effects can include harmful organisms, e.g., harmful fungi or insects, diseases, drought, low water, heat, wind, cold, frost, pollution, saline-containing water, and polluted water. In some embodiments of the invention, the biochars described herein can improve water retention, drainage, aeration, or the effects of compaction. In other embodiments of the invention, the biochars can be used to improve crop quality or nutritional value. Blends of organism, nutrient, and biochar can be used to form "terra preta" soil. A discussion of terra preta can be found in PCT Publication No. WO 2009/021528 and U.S. Patent Publication Nos. 2004/0111968 and 2007/0148754, each of which are incorporated herein by reference.

The biochars described herein can lead to increased crop yield, lower use of water or irrigation, less nutrient run-off, reduced fertilizer use and cost, reversed soil degradation, and elimination, reduction, or avoidance of GHG emission from soil.

The biochars that can be produced using the methods and systems described herein can be used to reduce pollution in water run-off streams and also to improve retention of water. The biochars can be used to remove phosphorous and nitrogen compounds from water streams or from other sources. The biochars can be used to protect ground water and other water bodies from undesired effects. For example, biochar can be distributed at an agricultural site or a farming location such that runoff or other undesired materials do not contaminate the ground water or other bodies of water.

Figure 6:
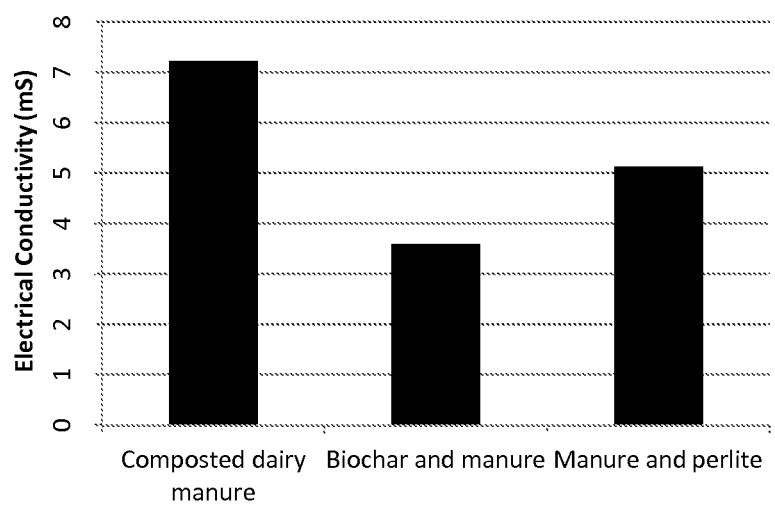
FIG. 6 is a graph depicting electrical conductivity of biochar as compared to other compositions.

FIG. 6 shows a graph of the capacity of biochar compositions in removing nutrients from a solution relative to composted dairy manure and manure and perlite, measured as electrical conductivity (mS) in leachate samples of a composted manure and a sample of the manure mixed with biochar and an inert material (perlite). The electrical conductivity is an indication of the nutrient salts in the leachate. Three treatments were used. Treatment 1 was Equal volumes of manure alone, Treatment 2 is Manure plus biochar (50% by volume) and Treatment 3 is Manure plus perlite (50% by volume). As shown by FIG. 6, biochar is more effective than the inert material in removing nutrients from solution. Treatment 1 and 3 reflect the displacement of manure by the inert material (i.e., dilution).

In some embodiments of the invention, a biochar is produced that can be used for bioremediation. The biochar can be designed to absorb toxic chemicals or have organisms that can convert the toxic chemicals to less harmful chemicals. Examples of using biochar for bioremediation are discussed in PCT Publication No. WO 2009/016381, incorporated herein by reference in its entirety.

The invention provides for a method to reduce the leachable concentration of nutrients in nutrient rich wastes. In some embodiments, a biochar core is mixed in defined quantities with composted animal manures to reduce the leachable nutrient concentration of those materials. A biochar core can be mixed in defined quantities with nutrient rich composts to reduce the leachable nutrient concentration of those materials. A biochar core can be mixed in defined quantities with nutrient rich wastes to reduce the leachable nutrient concentration of those materials.

In other embodiments, the invention provides for a method to modify the availability of phosphorus. A biochar core can be selected for its ability to interact directly or indirectly with inorganic phosphorus or organic phosphorus, modifying the availability of phosphorus to growing plants. A biochar core can be used to modify the availability of phosphorus in nutrient rich organic waste streams. In some embodiments, inorganic or phosphorus rich organic materials sources are blended with biochar core and other organic materials to create with specified availability of phosphorus to growing plants.

In other aspects, the invention provides for a method to modify the availability of nitrogen. A biochar core can be selected for its ability to interact directly or indirectly with inorganic nitrogen sources, modifying the availability of nitrogen to growing plants. Inorganic nitrogen sources can be added to a biochar core as a solution modifying the availability of nitrogen to growing plants. Inorganic nitrogen sources can be blended with biochar core to modify the availability of nitrogen to growing plants. Inorganic nitrogen sources can be blended with biochar core and organic materials to create biochar with specified availability of nitrogen to growing plants.

Nitrogen and/or phosphorus rich waste materials can be mixed with a biochar or mixed with an organic matter to be pyrolyzed, which then forms a biochar with a selected phosphorus and/or nitrogen availability. Phosphorus rich wastes can include poultry litter and cattle wastes (dry bedded manures) and solids from anaerobic digestion. The waste can be pyrolysed and the nutrients, such as phosphorus and nitrogen, can be within the biochar as salts or in the organic structures themselves of the biochar.

Additionally, the biochar can be mixed with coconut coir, aged pine bark, redwood, or other carbon sources. In some embodiments the saturated media extract can have a reduced salt concentration. This can be measured in terms of electrical conductivity, and in a saturated media extract the electrical conductivity can be about 1.5-5.0 Ms/cm. Additional nutrients may then be added to balance the nutrient composition in the media. In some embodiments the available phosphorus and/or nitrogen can be characterized as the phosphorus and/or nitrogen that is in a specified chemical form or the types of phosphorus and/or nitrogen that can be metabolized by a plant, fungus, or any other growing organism. In some embodiments, the available nutrients, such as available phosphorous and/or available nitrogen, are those that can be metabolized by a plant. For example, available phosphorus may be in phosphorus in the form of orthophosphates and available nitrogen can be nitrogen in the form of nitrates, ammonium or ammonia.

The amount of total phosphate or nitrogen in the biochar or biochar blend, as measured on a phosphate or nitrogen basis per amount of biochar or biochar blend, can be about, less than about, or greater than about 0.001, 0.005, 0.01, 0.05, 0.1, 0.5, 1, 2, 3, 4, 5, 10, 50, 100, 500, 1000, or 1500 mg/mL. The amount of total phosphate or nitrogen, as measured on a phosphate or nitrogen basis per amount of biochar or biochar blend, can be about, less than about, or greater than about 1, 2, 3, 4, 5, 10, 20, 30, 40, 50, 75, 100, 200, 300, 400, 500, 600, 750, 1000, 2000, 3000, 5000, 7500, 10000, 50000, 100000, 250000, 500000, or 1000000 ppm. The amount of total phosphate or nitrogen, as measured on a phosphate or nitrogen basis per amount of biochar or biochar blend, can be between about 50-100, 500-1000, 5-1000, 50-10000, 150-1000, 1500-10000, 15-10000, 150-100000, 10-250000, or 1-2500000 ppm. The amount of total phosphate in the biochar or biochar blend can be between about 50-100 or 500-1000 ppm. The amount of total nitrogen can be between about 150-1000 or 1500-10000 ppm.

The nutrient content and formulation in the biochar or biochar blend can be selected such that the total phosphorus or nitrogen in the biochar or biochar blend, which can be used as a soil amendment, can be 1, 1.5, 2, 2.5, 3, 5, 6, 10, 20, 50, 100, 200, 300, 500, or 1000 times greater than the amount of available phosphorus or nitrogen provided by a biochar or biochar blend. The total phosphorous and/or total nitrogen may be greater than the available phosphorous and/or available nitrogen by including organic forms of nitrogen and phosphate that may not be directly metabolized by a plant or any other specific organism.

The amount of available phosphate or nitrogen contained in the biochar or biochar blend, as measured on a phosphate or nitrogen basis per amount of biochar or biochar blend, can be about, less than about, or greater than about 0.001, 0.005, 0.01, 0.05, 0.1, 0.5, 1, 2, 3, 4, 5, 10, 50, 100, 500, 1000, or 1500 mg/mL. The amount of available phosphate or nitrogen contained in the biochar or biochar blend, as measured on a phosphate or nitrogen basis per amount of biochar or biochar blend, can be about, less than about, or greater than about 1, 2, 3, 4, 5, 10, 20, 30, 40, 50, 75, 100, 200, 300, 400, 500, 600, 750, 1000, 2000, 3000, 5000, 7500, 10000, 50000, 100000, 250000, 500000, or 1000000 ppm. The amount of available phosphate or nitrogen contained in the biochar or biochar blend, as measured on a phosphate or nitrogen basis per amount of biochar or biochar blend, can be between about 50-100, 5-1000, 150-1000, 15-10000, or 10-250000 ppm.

The amount of available phosphate provided by the biochar or biochar blend in the biochar or biochar blend can be between about 10-500, 25-250, or 50-100 ppm, as measured from extraction of a saturated solution exposed to the biochar or biochar blend. The amount of available nitrogen provided by the biochar or biochar blend can be between about 50-5000, 100-2500, or 150-1000 ppm, as measured from extraction of a saturated solution exposed to the biochar or biochar blend. In some embodiments, it may be desirable to control the nitrogen and phosphorous levels to be within a selected range so as to support plant growth.

The phosphorus and/or nitrogen availability can be selected such that a microbial biomass can be supported. The microbial biomass can provide for an effective slow release of phosphorus and nitrogen to plants. By balancing currently available phosphate and nitrogen sources with other phosphate and nitrogen sources that can be metabolized by microbes, the biochar or biochar blend can achieve desired nitrogen and phosphate release profiles.

In other embodiments, a biochar composition can have a selected phosphorus and/or nitrogen availability that is effective at a predetermined time period, for example within one year or after 1, 2, 3, 4, 5 or more years. The biochar composition can have a phosphorus availability that is expressed relative to a conventional phosphorus availability.

The invention provides for a method to reduce the carbon footprint of corn based ethanol by using crop residues and by-product of manufacture to sequester carbon and produce energy. In some embodiments, predetermined set of operating parameters for producing a biochar include a time-dependent temperature profile to produce a biochar core with a specified rate of degradation. The rate of degradation can be any degradation rate described herein. For example, the rate of degradation may be about or less than about 20, 15, 10, 5, 2.5, 1, 0.5, or 0.1% per year. The rate of degradation can be measured over a time span of 1, 2, 5, or 10 years or longer. In other embodiments, a biochar core can be used to reduce the carbon emissions associated with the production of corn based ethanol.

The invention provides for a method to reduce the carbon footprint of sugarcane based ethanol by using crop residues and by-product of manufacture to sequester carbon and produce energy. A predetermined set of operating parameters for producing biochar can include a time-dependent temperature profile to produce a biochar core with a specified rate of degradation. The rate of degradation can be any degradation rate described herein. For example, the rate of degradation may be about or less than about 20, 15, 10, 5, 2.5, 1, 0.5, or 0.1% per year. The rate of degradation can be measured over a time span of 1, 2, 5, or 10 years or longer. The biochar core can be used to reduce the carbon emissions associated with the production of sugarcane ethanol.

In some embodiments, biochar can be used to reduce nutrient pollutants in nutrient rich wastes. The nutrient rich waste can be in a landscape setting. Biochar can be used to retain nutrients in a wet pond. Biochar can be incorporated into the construction of a vegetated swale. Biochar can be incorporated in soil and other materials used to create a vegetated buffer strip. Biochar can be incorporated in the materials used in the manufacture of a constructed wetland. Biochar can be incorporated as part of a vegetated rock filter. Any of the biochars described herein can be used for bioretention.

In some embodiments, a biochar can be used to increase soil pH. The biochar can be used as a liming substitute. A biochar can be used as a substitute for lime in agricultural soils. A liming equivalency of biochar is established. Feedstock selection and pyrolysis conditions can be optimized to deliver desired liming equivalency. Biochar can be prepared for incorporation in soil in order to maximize the benefit of soil pH adjustment, particle size slurrying, blending with other materials that can be used to raise soil pH. Biochar can be incorporated in soil to adjust soil pH. In some embodiments, biochar can be used as a substitute for lime in horticultural growing media. Biochar can be incorporated in to growing media to alter the pH of the growing media.

The invention also provides for a method where thermal treatment by pyrolysis is used to reduce odor in poultry wastes. Bedding materials can be selected to influence the performance of pyrolysis to create a non odorous biochar. Pyrolysis process conditions can be optimized to reduce the odor of the biochar product.

In some embodiments, biochar can be treated post pyrolysis through heating to modify characteristics such as porosity and hydrophobicity. In some embodiments, equipment can be used to alter the particle size and particle size distribution. Materials can be introduced to biochar to reduce dust and improve handling. Biochars can be blended with one or more other materials, as described herein.

The invention provides for biochar delivery systems. These systems can be used to improve the efficiency of water use in raised bed growing systems. The biochar or a biochar blend, such as biochar mixed with another component, can be used with raised bed growing systems that utilize surface or subsurface irrigation systems to deliver water and nutrients. Biochar can be distributed uniformly within a bed in order to modify the water holding and water release characteristics of the soil. Alternatively, biochar or a biochar blend can be distributed non-uniformly within a bed in order to modify the water holding and water release characteristics of the soil.

Figure 7:
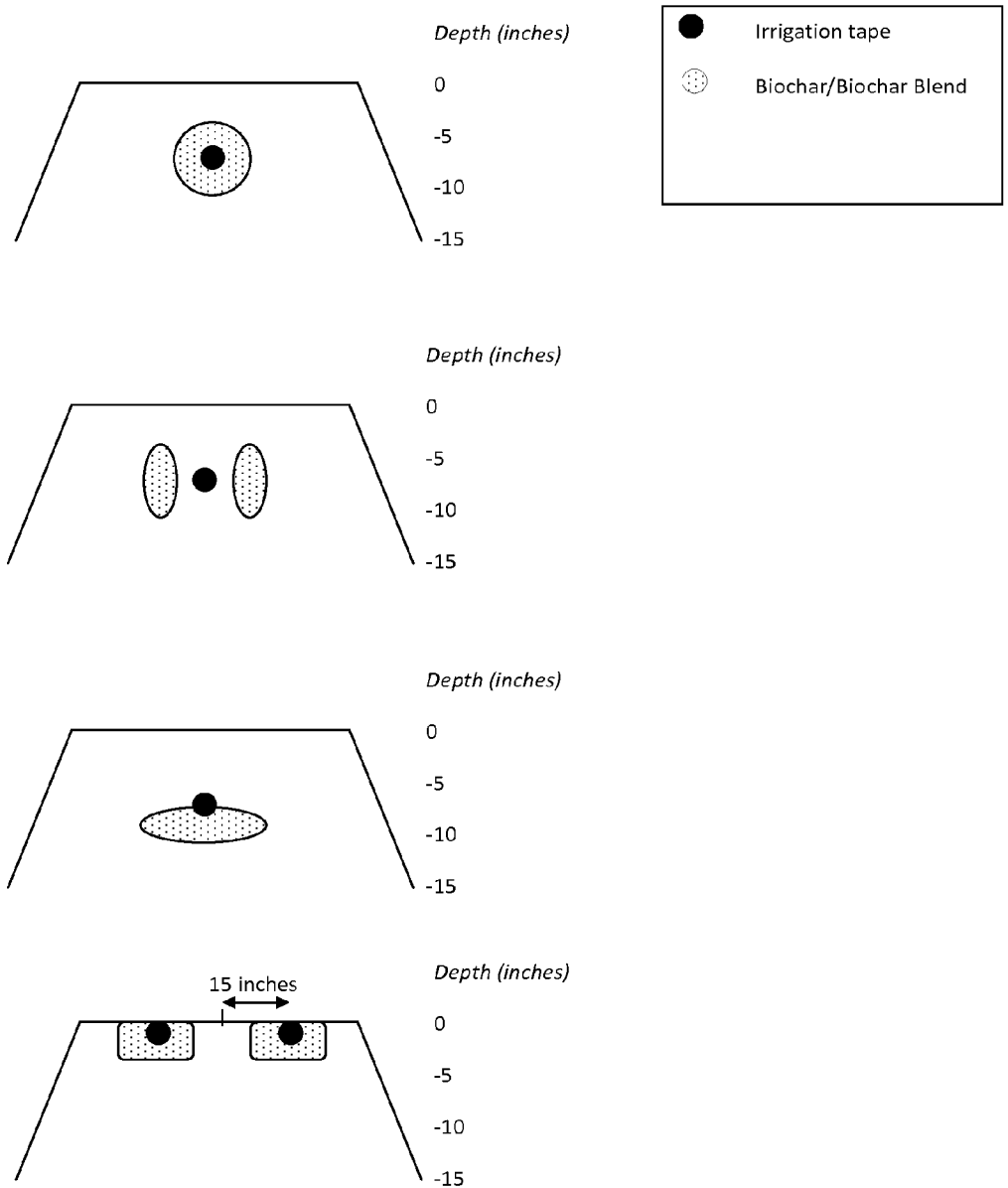
FIG. 7 is a schematic showing four different distributions of biochar or biochar blend used in a raised bed or in conjunction with an irrigation system.

The biochar can be positioned to intercept both water and nutrients that are applied to soil irrigation systems. The biochar can be layered above, below, and or to the sides of the subsurface. The biochar can be positioned less than, greater than, or at about 1, 2, 3, 4, 5, 6, 7, 8, 9, 10, 15, 20, or 30 inches from the subsurface irrigation system. The biochar can be in a layer that is 1, 2, 3, 4, 5, 6, 7, 8, 9, 10 inches thick. This layer may comprise of biochar alone, or mixed with soil or organic amendments. As shown in FIG. 7, the biochar or biochar blend can placed in a zone around the irrigation tape or system, or the tape or system may be installed over a bed of biochar or the biochar may be incorporated in zones to each side of the tape or system. The zone can be a concentric ring about the irrigation tape that is about, less than about, or at least about 1, 2 3, 4, 5, 6, 7 or 8 inches thick. As shown in FIG. 7, two irrigation tapes or systems, which may be parallel, can be installed at or near as soil surface and a zone of biochar or biochar blend can be positioned around and below the irrigation tapes or systems. The irrigation tapes or systems can be separated by about 5, 10, 15, 20, 30, 40, or 50 inches. The tape or system may be installed first and, afterward, the biochar or biochar blend can be placed along the tape or system.

The invention also provides for a method to modify the availability of nutrients applied through irrigation in raised bed growing systems. Biochar can be distributed uniformly within a bed in order to modify the availability of fertilizer nutrients applied to the bed. Alternatively, biochar can be distributed non-uniformly within a bed in order to modify the availability of fertilizer nutrients applied through buried irrigation systems in the bed.

In some embodiments, biochar can be used to reduce nitrous oxide emissions, which may be from soil. In some embodiments, use of biochar can allow for reduced usage of nitrogen fertilizer. This can be by controlling nitrogen availability, as described herein. The biochar can then be used to increase the unit of harvested product per unit nitrogen input or nitrogen fertilizer used. In other embodiments, biochar can be used to reduce nitrous oxide emissions from compost. In some embodiments, biochar is used to reduce indirect nitrous oxide emissions that result from the nitrification and subsequent denitrification of nitrate that has been leached from soil. Biochar can be incorporated in green waste compost to reduce emissions of nitrous oxide.

In other embodiments, the invention provides for a method to influence plant growth through signaling mechanisms. A pyrolysis process used to produce biochar can be optimized to produce organic compounds that stimulate plant growth. In some embodiments, biochar can be used to interrupt signaling mechanisms used by competing plants to regulate growth.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for preparing a soil amendment comprising: providing a biomass to a pyrolysis unit; pyrolyzing the biomass in the pyrolysis unit to produce a stable biochar core that has a rate of degradation that is less than 2.5% per year, wherein the biomass is pyrolyzed at a heating rate from 0.01° C./second up to 1000° C./second and at least one of (i) a temperature greater than 250° C. and (ii) a heating time greater than 0.001 days; and using the stable biochar to form a soil amendment for placement in a soil bed, wherein the soil amendment has a total phosphorus and a total nitrogen content that provides a concentration of available phosphorus and available nitrogen suitable to promote growth of an organism in the soil bed, which concentration of available phosphorus is at least about 1 part per million (ppm) and available nitrogen is at least about 1 ppm.

2. The method of claim 1, wherein the available phosphorus provided by the soil amendment is between about 5-1000 ppm and the available nitrogen provided by the biochar is between about 15-10000 ppm.

3. The method of claim 1, wherein the soil amendment has a selected air filled porosity that is greater than about 10% and a selected water holding capacity that is greater than about 20%.

4. The method of claim 1, wherein the biomass is pyrolyzed under (i) a heating rate between about 0.1° C./second and 50° C./second, (ii) a temperature greater than about 250° C., and (iii) a heating time greater than about 0.1 days.

5. The method of claim 1, wherein the biochar core is treated with a wetting agent.

6. The method of claim 1, wherein the biochar core is mixed with soil or with coconut coir to form the soil amendment.

7. The method of claim 1, wherein the biochar is pH adjusted to a pH less than about 6 using $AlSO_4$.

8. The method of claim 1, wherein the soil amendment is used in conjunction with an irrigation system.

9. The method of claim 8, wherein the soil amendment is positioned in a layer that is about 3 inches away from an irrigation system.

10. The method of claim 8, wherein the soil amendment is positioned below an irrigation system in a layer that is about 4 inches thick.

11. The method of claim 1, wherein the stable biochar has increased capacity to hold a nutrient or microbial inoculant.

12. The method of claim 1, wherein the pyrolysis unit is a gasifier.

13. The method of claim 1, wherein using the stable biochar to form the soil amendment comprises contacting the biochar core with a supplement to produce a functionalized biochar core, which supplement includes a nutrient or biological energy source that enables growth of an organism in the soil bed.

14. The method of claim 1, wherein the heating rate is controlled to within 20° C. per second.

15. The method of claim 1, wherein the temperature is controlled to within 20° C.

16. The method of claim 1, wherein the heating time is greater than or equal to 0.01 days.

17. The method of claim 16, wherein the heating time is greater than or equal to 0.1 days.

18. The method of claim 1, wherein the heating rate is from 0.1° C./second up to 1000° C./second.

19. The method of claim 18, wherein the heating rate is from 1° C./second up to 1000° C./second.

20. The method of claim 1, wherein the biomass is pyrolyzed at a heating rate from 0.01° C./second up to 1000° C./second and (i) a temperature greater than 250° C. and (ii) a heating time greater than 0.001 days.

21. The method of claim 1, wherein the concentration of available phosphorus is at least about 5 ppm and available nitrogen is at least about 15 ppm.

* * * * *